United States Patent [19]
Jaworski

[11] 4,349,434
[45] Sep. 14, 1982

[54] FILTRATION SYSTEM FOR SPAS, HOT TUBS, SWIMMING POOLS AND THE LIKE

[76] Inventor: William R. Jaworski, 26075 Birch Bluff Rd., Excelsior, Minn. 55331

[21] Appl. No.: 259,710

[22] Filed: May 4, 1981

Related U.S. Application Data

[63] Continuation-in-part of Ser. No. 110,332, Jan. 7, 1980, abandoned.

[51] Int. Cl.³ .............................................. B01D 35/02
[52] U.S. Cl. ...................................... 210/94; 210/149; 210/169; 210/184; 210/416.2
[58] Field of Search .................. 210/94, 97, 167, 169, 210/175, 182, 183, 185, 316, 443, 473, 455, 456, 149, 416.2; 4/493; 219/296, 306

[56] References Cited

U.S. PATENT DOCUMENTS

| | | | |
|---|---|---|---|
| 2,204,158 | 6/1940 | Serio et al. | 210/473 |
| 2,429,321 | 10/1947 | Brecque | 210/183 |
| 3,012,676 | 12/1961 | Englesberg | 210/169 |
| 3,168,470 | 2/1965 | Rhoda | 210/316 |
| 3,498,458 | 3/1970 | Weber | 210/167 |
| 3,767,050 | 10/1973 | Reiner | 210/169 |
| 3,781,925 | 1/1974 | Curtis | 4/172.1 S |
| 3,988,787 | 11/1976 | Colee | 4/172.17 |
| 4,059,520 | 11/1977 | Roller | 210/184 |
| 4,091,265 | 5/1978 | Richards et al. | 219/501 |
| 4,185,187 | 1/1980 | Rogers | 219/306 |

*Primary Examiner*—John Adee
*Attorney, Agent, or Firm*—James V. Harmon

[57] ABSTRACT

The invention provides a filtration system suited to be coupled in a water transfer circuit with a tub, pool, spa, or the like, and includes a housing or casing within which is provided a filter element through which the water passes during operation. In one preferred embodiment, a heater is provided within the housing. The heater comprises an electrical heating element positioned within the center opening of an annular filter element. A pump and motor can be connected to the housing in a water transfer circuit. A strainer for removing hair, lint, or the like is preferably provided within the circuit upstream from the pump, that is to say, between the inlet of the pump and the spa or tub. The strainer can be located within the filter housing adjacent to and in fluid communication with the filter and between the filter and a removable cover releasably secured to the housing.

13 Claims, 12 Drawing Figures

FILTRATION SYSTEM FOR SPAS, HOT TUBS, SWIMMING POOLS AND THE LIKE

This application is a continuation in part of my prior application bearing the same title, Ser. No. 06/110,332, filed Jan. 7, 1980 now abandoned.

FIELD OF THE INVENTION

This invention relates to water treatment and more particularly to a water filtration system for use in connection with baths, hot tubs, swimming pools and the like.

THE PRIOR ART

The tremendous increase in recent years in the use of hot tubs and spas has provided the basis for a booming new industry. The major components of these systems are a tub, spa, or pool, a water pump, and filtration system, and a heater. Besides moving the water through a filter, the pump ejects the water through hydrotherapy jets when they are present. The pump, of course, also transfers the water through the filtration system and the heater. Two or more pumps can be used to separate the jet action from the filtering and heating functions.

Several types of filters can be used, the most common are sand filters, diatomaceous earth filters and cartridge filters. The first two are used almost exclusively in the pool industry. The cartridge type can be either a surface type comrising a folded sheet of porous material or the depth-type, commonly made of fiberglass or polyester, both being removable and replaceable. The surface type filter is the most commonly used in connection with treating waters in spas and hot tubs. It provides good filtration, ease of cleaning and can be replaced by the consumer. Commercial systems in wide use will now be described.

The filter element is housed by itself in a casing to which inlet and outlet water lines are connected.

In a separate casing from the filter is provided a strainer for removing relatively large particulate materials such as hair and lint. The strainer is almost always mounted at the inlet of the pump. In this way, large particles are removed just prior to entering the pump to prevent the pump impeller from becoming fouled.

In commercially available equipment, there is a third casing within which is provided a heater, either electric or gas. In either case, the heater can be of the tank type or tankless. Tank type heaters which are similar to the domestic hot water heater waste energy because the heat continues to cycle on and off even though water is not being transferred from the tank to the pool or tub. Commercially available tankless heaters have been used in series with the pump and filter. They are mounted either in their own casing or within a portion of the piping which is made large enough in diameter at that point to accommodate the heater.

Virtually all water filtering systems of the type described are either pressure or vacuum types, that is to say, either have the pump upstream from the filter or downstream from the filter. The water leaving the filter can either pass through the heater casing or in a modified piping arrangement, a portion of the water, say 50%, passes through the filter while the other 50% is allowed to bypass the filter and pass through the heater. In some filter systems previously used, the strainer is eliminated and water is allowed to pass first through the filter and then to the pump. One problem with this system is that large flat objects such as leaves can clog the filter quickly and prevent adequate flow. Strainer baskets on the other hand were designed to hold a large amount of debris of this kind without clogging, thereby allowing the filter to work effectively.

Thus, among the shortcomings of the prior art, is the requirement for separate housing for the strainer, filter, and heater. Another problem is the expense of the several separate components of the system and the cost of the manual labor necessary to install the requisite piping between these separate components. Another problem is the tendency for the relatively small invisible water flow openings of the filter to become clogged with debris in some prior systems and the need for the strainer and filter to be separately examined and removed for replacement. Thus, the consumer must examine the strainer, and after deciding whether or not to empty the strainer, he must then proceed to the casing where the filter is located, open the casing around the filter, evaluate the condition of the filter and either clean or replace it as required.

In summary, the separate casings previously used for the strainer, motor, filter and heater make the equipment expensive and occupy a considerable amount of floor space. Installation costs are also greater since connection pipes must be installed. In addition, the strainer, pump impeller and filter must be separately removed and examined for cleaning or replacement. When it becomes necessary to inspect the heater, it cannot be done without a great deal of difficulty. The difficulty results largely from the lack of space around the heating element which prevents one from inspecting the element without actually removing it. Another problem is energy loss. From the motor alone, about 40-80% of the power supplied is wasted.

OBJECTS

The primary object of the invention is the provision of an improved device of the character described having the following features and advantages:

a. A compact apparatus that has been made lower in cost than prior units through the elimination of parts and occupies less floor space.

b. The provision of a heating and filtering device for a pool, spa, or the like, which has the advantage of paragraphs a to i and is also capable of heating and filtering water as well as equipment in commercial use at the time the invention was made.

c. Provision for heating and filtering water for a hot tub, spa, or pool with a means for preventing the build-up of deposits of material on the filter and effectively preventing damage to the heater from suspended solids.

d. Provision that enables one to remove the filter and strainer simultaneously for more efficient cleaning and inspection.

e. A means to prevent tampering or accidental finger contact with the heating elements while energized.

f. Provision for reducing the time, effort, and cost of installation through the elimination of interconnecting piping while at the same time reducing the likelihood of errors made in installation.

g. The provision of adequate space and hook-up connections for heaters ranging from 1500 watts to 12,000 watts or more.

h. Provision for employing the invention in different applications with the filter either on the suction or pressure side of the pump as desired and when on the pressure side of the pump, means is provided for straining water on the upstream side of the pump.

i. A means for providing a variable flow rate over the length of the heating element whereby the water that is the coolest flows over the heater the slowest and the highest temperature water flows with the greatest velocity over the heater, thereby maximizing heating efficiency.

j. Eliminate the need for a separate motor and pump housing.

k. Recover energy normally lost from the motor.

l. Improve pump efficiency.

m. A provision enabling the pump impeller to be inspected while inspecting the screen and filter, i.e. when screen and filter are removed, the impeller can be seen.

SUMMARY OF THE INVENTION

The invention provides a filtration system suited to be coupled in a water transfer circuit with a tub, pool, spa, or the like, and includes a housing or casing within which is provided a filter element through which the water passes during operation. A heater means coupled to the filter can be provided within the same casing as the filter. In one preferred embodiment, the heater comprises an electrical heating element positioned within the center opening of an annular filter element. A pump and motor is adapted to be connected in the water transfer circuit with the filter and a strainer is preferably provided for removing hair, lint, or the like. The strainer is located within the circuit upstream from the pump, that is to say, between the inlet of the pump and the spa or tub. The strainer can also be within the filter housing adjacent to and in fluid communication with the filter and between the filter and a removable cover releasably secured to the housing.

In one form of the invention, the filter housing is provided with a chamber therein within which the filter is removably mounted. The filter element is characterized by having relatively small invisible water flow openings extending through itself. The housing inludes means to provide access to the chamber for removing the filter, e.g., an opening provided in the housing through which the filter can be withdrawn. A removable cover seals the opening in the housing. The housing also includes a water inlet duct which communicates though the housing wall with one side of the filter and an outlet duct which communicates through the housing with the other side of the filter so that the water passing into the housing flows through the filter and is exhausted through the outlet. Within the housing between the filter and the inlet duct is mounted a strainer element having relatively large visible openings. Water flowing through the filter passes first through the strainer so that relatively large debris is removed before it can reach the filter. An electric heater or other heating means is connected in fluid communication with the filter and strainer for heating the water passing therethrough. This apparatus is adapted to be connected in a water circuit with a pump and the tub, spa, or pool.

The cover is preferably formed from clear transparent material and the strainer is mounted in a position in which it is visible through the cover for inspection. The strainer is preferably positioned adjacent to the filter and most preferably between the cover and the filter.

In another embodiment the pump and its drive motor are in the same housing as the filter and strainer. The motor is preferably located centrally of the filter with the pump impeller positioned between the strainer and the filter for forcing water that has passed through the strainer radially outward and then through the filter.

DETAILED DESCRIPTION

Figures 1, 2, 3:
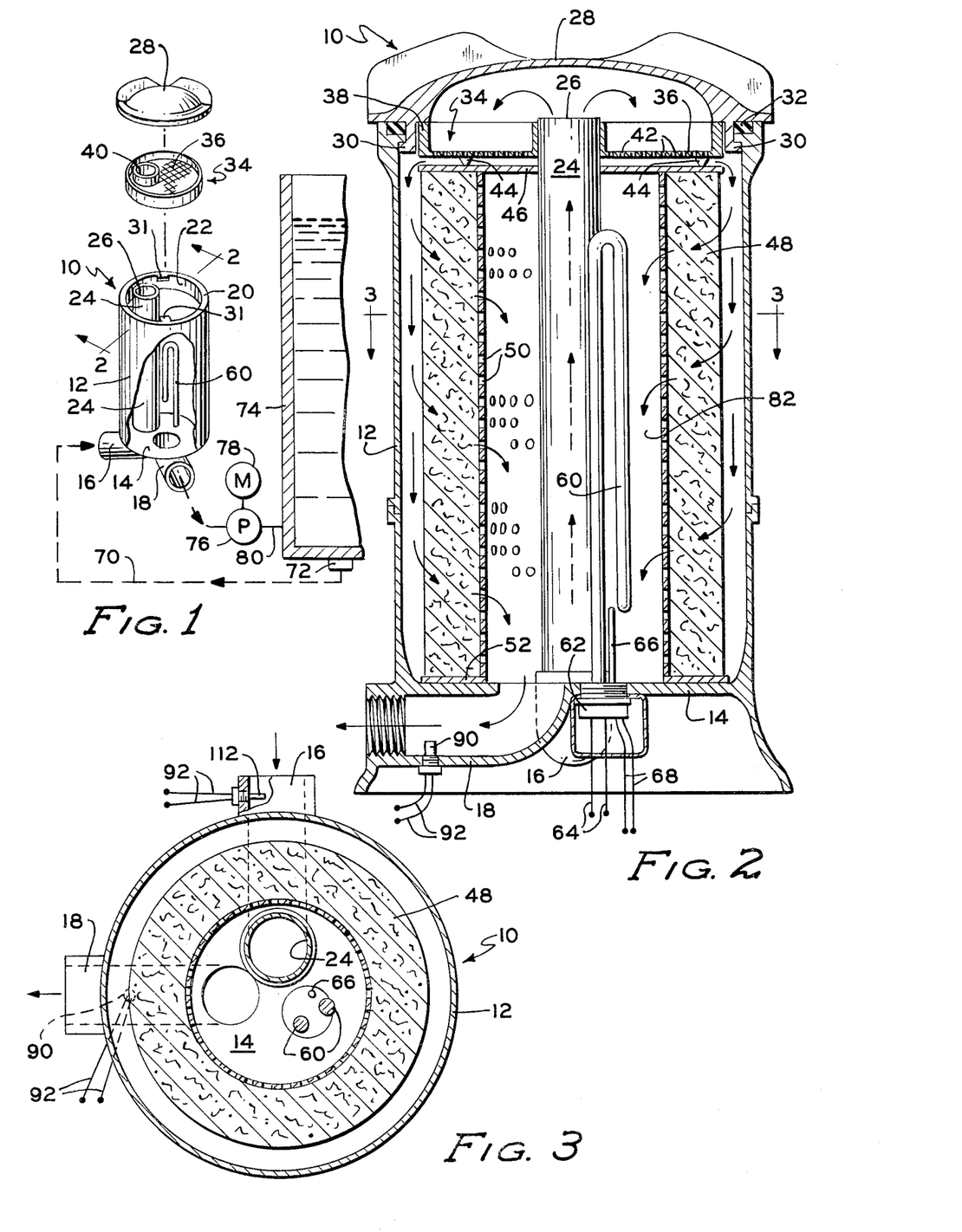
FIG. 1 is a perspective view of the invention.
FIG. 2 is a vertical sectional view taken on line 2—2 of FIG. 1.
FIG. 3 is a horizontal sectional view taken on line 3—3 of FIG. 2.

Refer now to the drawings and particularly, to FIGS. 1, 2 and 3. Shown in the drawings is a heater and filter to be used in conjunction with a spa, hot tub, swimming pool, or the like, and designated generally by numeral 10. The apparatus 10 includes a cylindrical housing 12 having a horizontal circular bottom wall 14 through which communicate inlet and outlet ducts 16 and 18, respectively. The housing 12 terminates at a free upper edge 20 to define a top opening 22 which provides access to the interior of the chamber. Connected to the inlet duct 16 is a vertically disposed upwardly extending stand pipe 24 through which incoming water rises as it flows into the housing 12. The stand pipe is provided with a free upper open end 26 through which the incoming water enters the housing. Secured to the top of the housing is a clear plastic cover 28 which can be formed from lexan or other suitable clear plastic. As seen in FIG. 2, the cover 28 is provided with downwardly and radially extending lugs 30 which when rotated, engage the mating lugs 31 on the free upper edge 20 of the housing 12. In this way, the removable clear plastic cover 28 can be quickly placed in position or removed as required by rotating the cover to engage the lugs 30 with the corresponding lugs 31 at the top of the housing 12. A suitable rubber ring 32 or other sealing means is provided between the cover and the housing to create a leak-proof seal.

Positioned just below the cover 28 is a strainer basket 34 having a generally circular horizontally disposed strainer section 36 and a circular upwardly projecting sidewall 38. The strainer basket 34 includes an opening 40 through which the upper edge of the stand pipe 24 projects. The openings 42 in the bottom wall of the strainer basket are of a relatively large size compared with the openings in the filter to be described below. The openings 42 are typically from between about 1/16" and ¼" in diameter or larger with a preferred size being on the order of about 150" across. Strainer 34 is used for the purpose of removing relatively large sizes debris such as leaves, and hair, and in this way protecting the filter to be described below. The strainer basket 34 slides easily down over the stand pipe 24 and fits telescopically within the top of the housing 12. In this way, the strainer basket can be placed in position or removed manually simply by dropping it in place or removing it, e.g., as in lifting it out when it needs to be emptied. The strainer basket 34 is provided with downwardly extending stand-offs 44 to hold it above the upper wall 46 of a cylindrical cartridge filter 48 of any suitable known construction such as pleated paper of fabric and including an inner cylindrical perforated wall member 50, a hollow cylindrical center opening 82 and an annular bottom wall 52. The cartridge filter 48 can be of any suitable commercially available type and by itself, forms no part of the present invention. While a variety of filters 48 can be used, a porous paper or fiber filter is the most preferred.

It can be seen by reference to FIG. 2 that the stand-offs 44 support the strainer basket 34 a slight distance above the top wall 46. This allows water entering through the stand pipe 24 to pass downwardly through the strainer basket 34 into the water flow compartment between the strainer basket and the top wall 46 of the filter, then flow outwardly into a space surrounding the filter 48, then centrally through the filter 48 into the opening 82 within the center of the filter.

Inside the opening 82 within the filter 48 and supported from the bottom wall 14 is an upwardly extending heating means such as an electrical resistance heater 60. The resistance heater 60 is supported from a junction box 62 at the bottom of the housing and secured thereto in any suitable manner as by means of a screw threaded connection. Conductors 64 supply current to the heater. Adjacent to the heater is a high limit switch 66 of suitable known construction connected in a circuit as will be described below by means of conductors 68.

In a typical application, the apparatus 10 is coupled with a water inlet line 70 connected to the water inlet 16 from the outlet 72 of the hot tub 74. The outlet duct 18 is coupled through a suitable pump such as a centrifugal pump of any well known commercially available construction 76 operated by an electric motor 78 to a duct 80 communicating with the hot tub 74.

It will thus be seen that the strainer 34 protects the filter 48 by collecting large debris before it can impinge upon the surface of the filter 48. After passing through the filter, the water flows over the heater 60 and is thereby warmed prior to being exhausted through the outlet duct 18.

The design shown in FIGS. 1 through 3 is of the vacuum type, that is to say, with the strainer and filter being located upstream from the pump and motor. The invention can, however, be connected to operate as a pressure system, i.e., downstream from the pump and motor if desired, as will be described below. In FIGS. 1 through 3, the water returning through line 70 from the hot tub enters through inlet 16, passes upwardly through stand pipe 24 and through the strainer basket 34. The water then flows laterally through the water flow compartment below strainer 34, into the space surrounding the outside of the filter cartridge 48, centrally through the cartridge as described above, and enters opening 82 at all points from the top to the bottom of the space 82 surrounding the heater 60. It is important to note that for this reason, flow past the heater 60 will be faster at the bottom near the outlet 18 than at the top where the water is cooler, in this way, heating efficiency will be maximized and the likelihood of over heating or boiling of the water adjacent to the heating element 60 is reduced. This is made possible by the provision for allowing entry of the water into the space around the heater 60 at a substantially constant rate at all points distributed longitudinally over the length of the opening 82 surrounding the heating element 60.

After the unit has been in operation for a time, the user need only look through the transparent plastic cover 28 to inspect the strainer basket 34. If the strainer basket needs emptying, the cover 28 can be easily removed and the strainer basket lifted out and emptied. At the same time, with very little further effort, the filter 48 can be lifted out, inspected, cleaned, or replaced and returned to position as required. Moreover, it will be seen that with both the strainer basket and filter removed, there is adequate space on all sides of the heater for repair, manual manipulation, or inspection as required. This is an important advantage of the invention when contrasted with the placement of heating elements in pipes or other confined spaces. Since the strainer basket and filter, as well as the heating element, are all located in the same housing, cover 28 need be removed only once for inspecting, replacing, or repairing any of these three elements. This is an important advantage to the user.

Mounted in the water outlet duct 18 is a pressure sensing flow control switch 90 having lead wires 92. Switch 90 is normally off and turns on or closes only when the pressure of the surrounding water exceeds a selected value. When pressure is insufficient, e.g., because of a leak or as a result of removing the cover 28, or due to any thing that would cause insufficient flow, the switch 90 will open thereby preventing melting of the plastic components.

Figure 7:
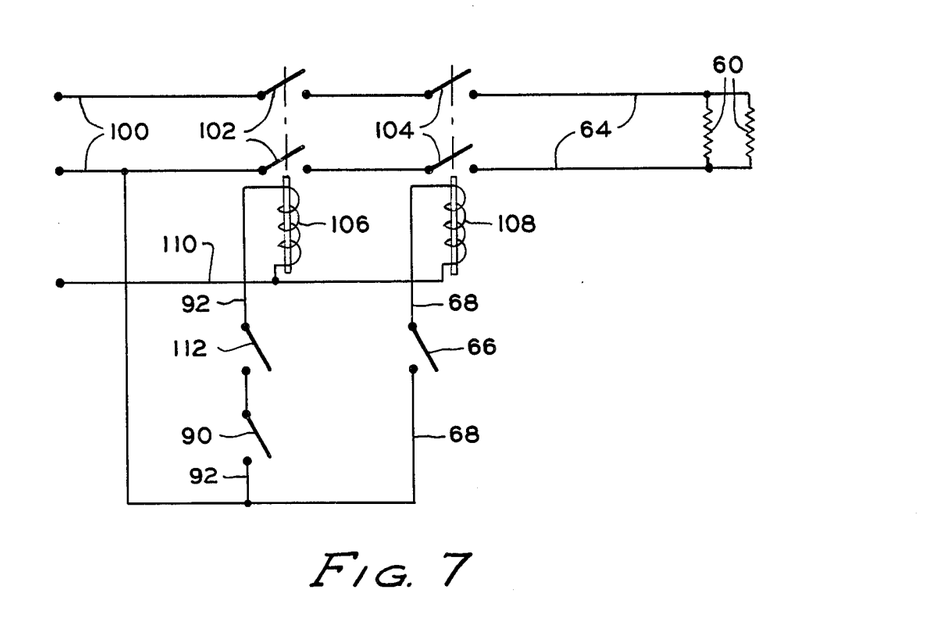
FIG. 7 is an electrical circuit diagram using in a preferred form of the invention.

As seen in FIG. 7, current is suitably supplied for example through standard 240 volt AC lines 100 to a pair of double pole relays 102 and 104 connected in parallel with the heater circuit by conductors 64. The armatures 106 and 108 of the relays are connected across neutral power supply line 110. Relay 106 is wired across a thermostatic switch 112 and the pressure switch 90 which, during operation, responds to the flow of water through the apparatus 10.

The armature circuit 108 is connected across the neutral power supply line 110 and the high limit switch 66 via a conductor 68. The thermostatic switch 112 is connected in series with the pressure switch 90 and both of them are connected in parallel with the high limit switch 66. Thus, during operation, opening of the high limit switch turns off the circuit to the heaters even though switches 90 and 112 are closed and vice versa. The thermostatic switch 112 is preferably set to be adjustable in the range between about 60° F. and 110° F.

From an inspection of the circuit of FIG. 7 and FIGS. 1 through 3, it can be seen that any time the pre-established upper temperature limit, e.g., 130° F. is exceeded, the high limit switch will pop open, thereby protecting the unit against overheating. Switch 66 can be reset manually.

Similarly, any time the flow is reduced to the point where the pressure switch opens, the current to the heating elements will be cut off. Thus, for example, if the cover 28 is removed, the reduction in pressure caused as a result will automatically turn off the heating elements, thereby preventing one from burning his fingers by accidentally touching the heating element 60.

Figure 8:
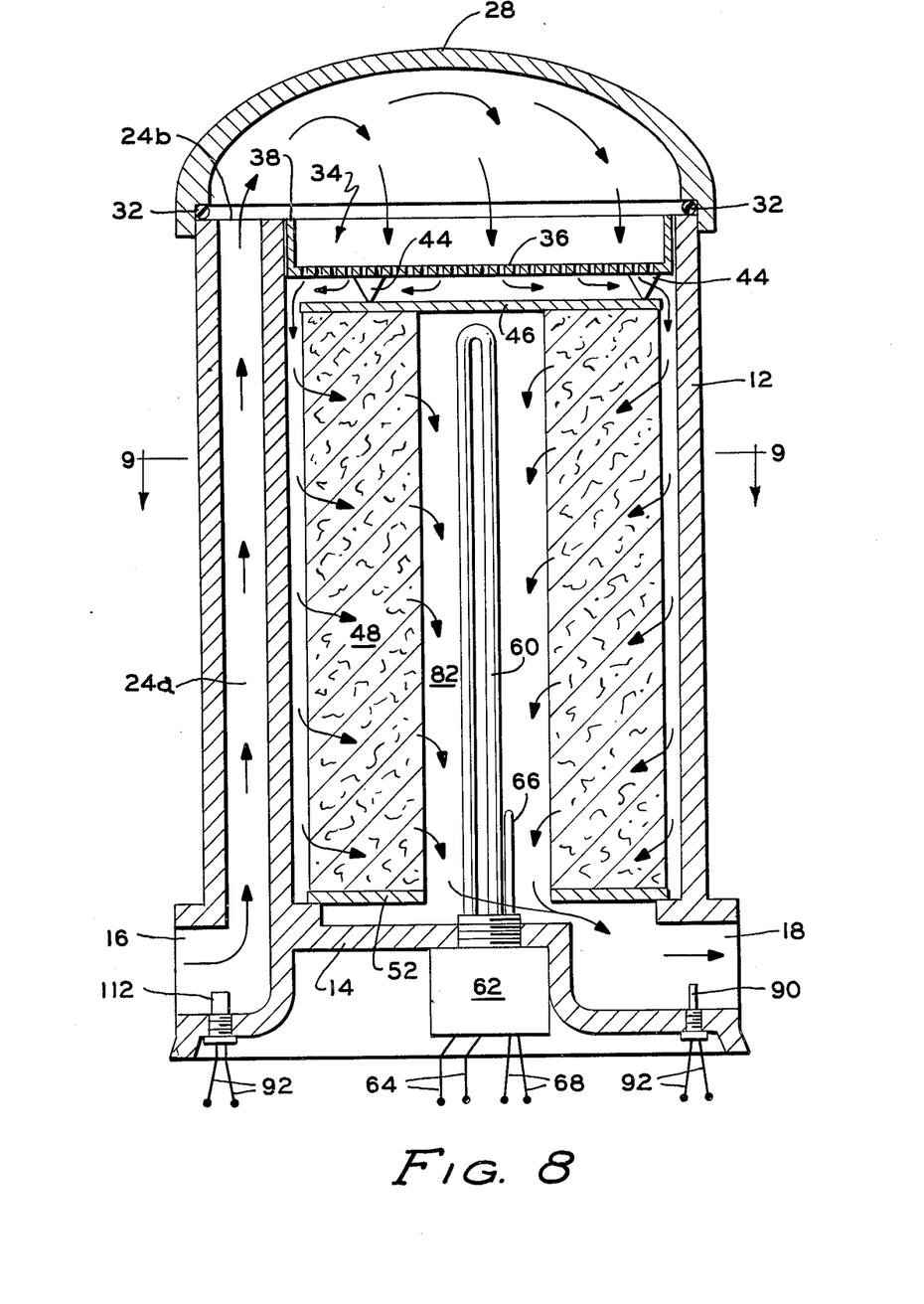
FIG. 8 is a vertical sectional view of another form of water heating and filtering apparatus in accordance with the invention.
Figure 9:
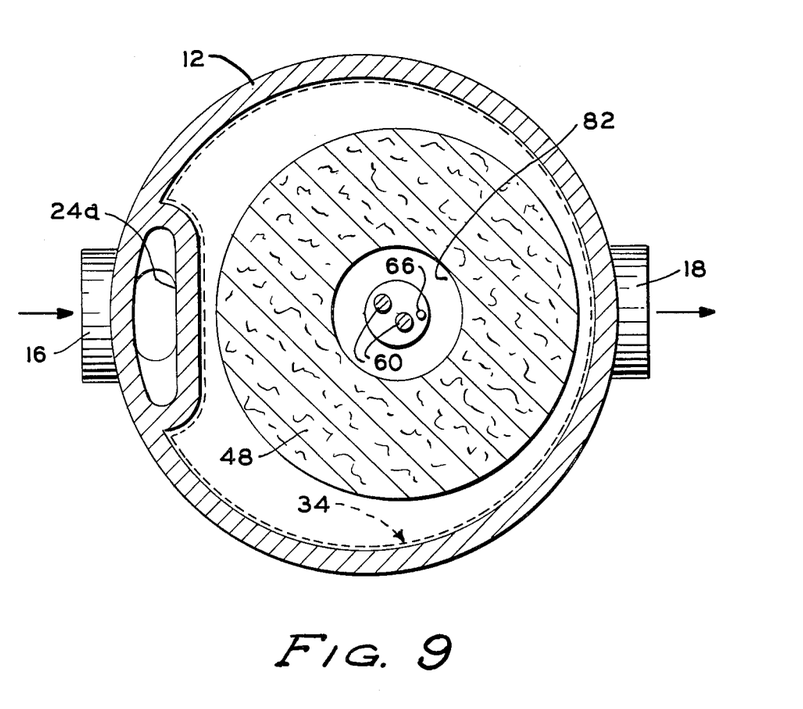
FIG. 9 is a horizontal cross-sectional view taken on line 9—9 of FIG. 8.

Refer now to FIGS. 8 and 9 which show another embodiment of the invention, utilizing a different stand pipe arrangement wherein the same numerals refer to corresponding parts in the several views.

As shown in FIGS. 8 and 9, the housing 12 is provided with an integral stand pipe 24a which extends upwardly along the inside surface of the housing wall 12 and adjacent thereto. As seen in cross-section, the center opening in the stand pipe 24a is elongated or oval. This will allow a filter 48 of maximum size to be inserted. During operation, water entering through inlet duct 16 will rise upwardly through the stand pipe 24a and pass out through the opening 24b at its upper end into the space at the top of the housing beneath the cover 28. The water is then free to flow downwardly through the strainer 34 which in this instance does not require an opening 40. It is otherwise in all respects similar to strainer 34 already described in connection with FIGS. 1 through 3. The flow of water from this point on is the same as that already described above, that is to say, the water flowing downwardly through the screen 36 passes radially outward between the strainer and the upper wall 46 of the filter cartridge into the space surrounding the filter 48, then through the filter centrally into the central chamber 82 around the heater 60 and finally, out through the water outlet 18.

Figure 4:
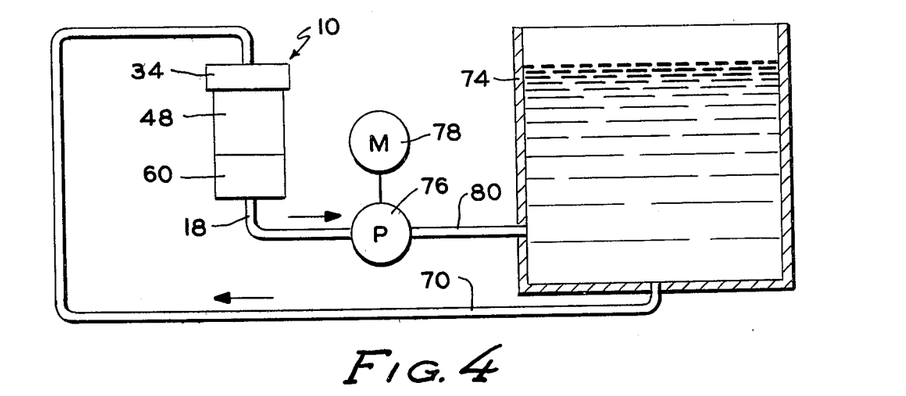
FIG. 4 is a schematic diagram of one preferred form of the invention showing inter-connecting piping.
Figure 5:
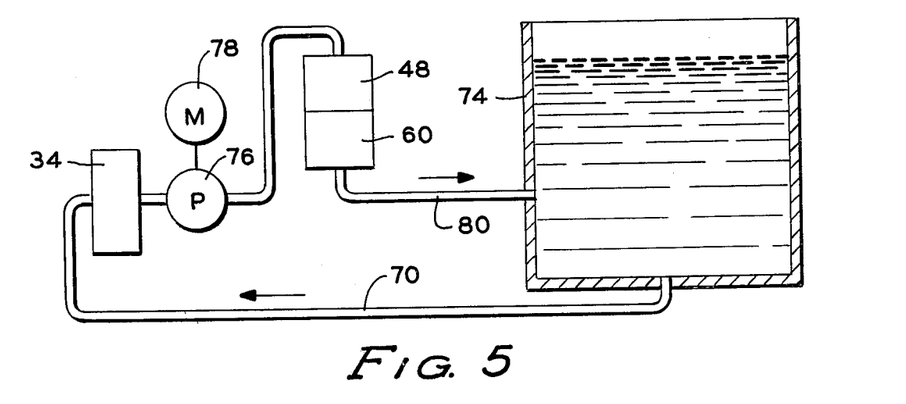
FIG. 5 is similar to FIG. 4 showing another embodiment.
Figure 6:
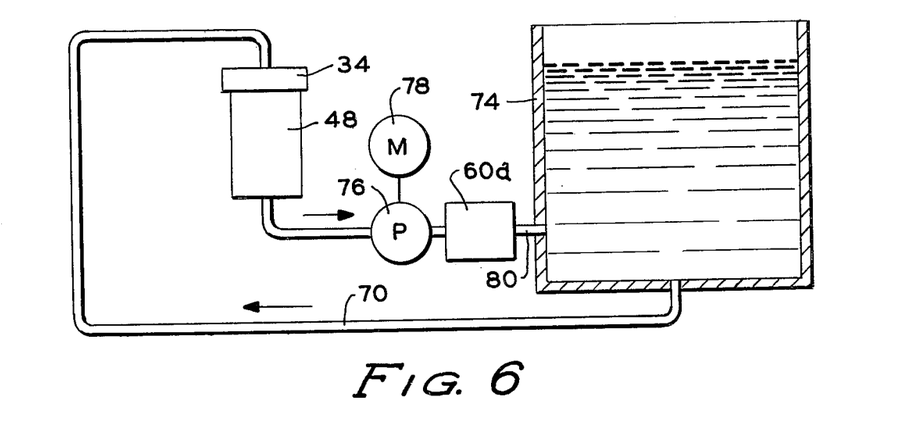
FIG. 6 is still another embodiment of the invention showing a different means of connecting various parts.

Refer now to FIGS. 4, 5 and 6 which illustrate different plumbing arrangements that are possible with the invention and wherein the same numerals are used to designate corresponding parts already described.

Shown in FIG. 4 is the plumbing arrangement already described in connection with FIGS. 1 through 3. In this case, the water passing out of the tub 74 through line 70 enters the strainer 34 first, then passes through the filter and heater 60 then out through the outlet duct 18 to the pump 76 and returns through line 80 to the hot tub 74. This illustrates a vacuum or suction arrangement for the filter and heater unit 10.

FIG. 5 illustrates a pressure arrangement of parts. In this case, the filter 48 and heater 60 are arranged downstream from the pump 76 and between the pump 76 and the inlet line 80 for the hot tub 74. The strainer 34 is, in this instance, simply omitted from the space in the housing 12 normally holding the strainer. Instead, a strainer 34 is provided upstream from pump 76. It can, if desired, conveniently be placed in the pump housing. In this application, the already strained water passes through the pump and then through the filter 48 and heater 60. The strainer 34 thus protects both the pump and the filter 48.

Refer now to FIG. 6. FIG. 6 illustrates an application of the invention wherein a separate or existing heater is used such as a gas fired heater 60a. In this case, the heating element 60 illustrated in FIGS. 1 through 3, 8 and 9, is removed from the housing 12. The heating function is provided by the heater 60a located in series with the strainer/filter combination, and preferably between the pump 76 and the inlet 80 of the hot tub 74. During operation of this apparatus, the water exhausted from the tub 74 through line 70 passes through the strainer 34 first, then through filter 48 and through pump 76 to the gas heater 60a. As in the embodiments of FIGS. 1 through 3, 8, and 9, the strainer and filter can be inspected and removed for replacement simultaneously and both provided within a single housing 12 thereby simplifying construction.

Figures 10, 11, 12:
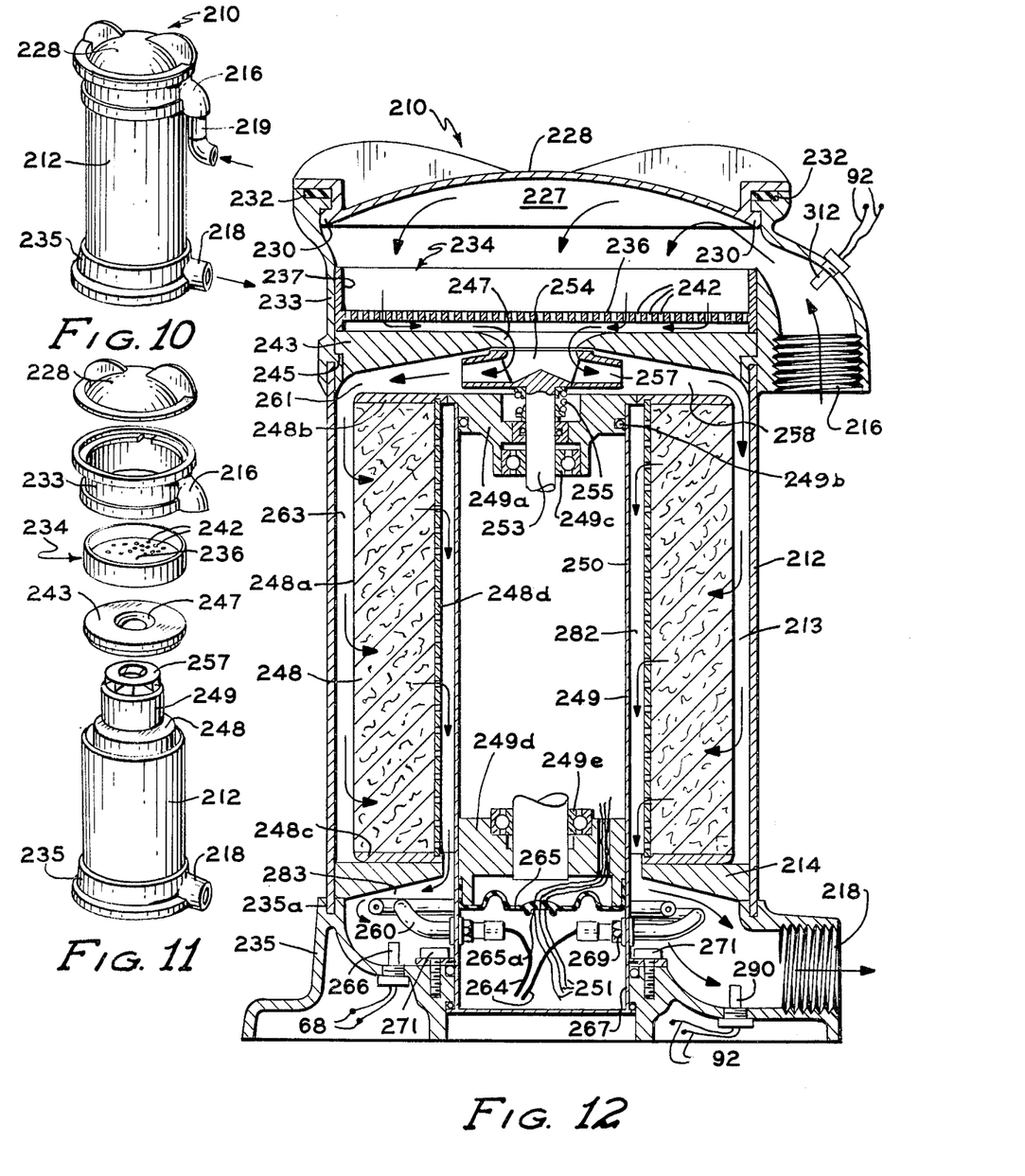
FIG. 10 is a perspective view of another embodiment.
FIG. 11 is an exploded view of FIG. 10.
FIG. 12 is a vertical sectional view of FIG. 10 on a larger scale.

Refer now to FIGS. 10, 11 and 12 which illustrate another embodiment of the invention in which the strainer, filter, pump and heater are combined in a single housing or casing.

The apparatus indicated generally by the numeral 210 includes a vertically disposed cylindrical housing 212 defining a hollow cylindrical filter compartment 213 having a lower wall composed of a ring-shaped removable ledge 214. Water enters the housing through an inlet port 216 and leaves through an outlet port 218 each suitably threaded for plumbing connections with water pipes of which only an inlet pipe 219 is shown (FIG. 10). At the top is a removable transparent cover 228 secured in place by lugs 230 and sealed with a circular sealing gasket 232. Just below the cover is a hollow housing head 233. At the bottom of the housing is a hollow housing base 235. The head and base are provided with the ports 216 and 218 respectively. Inside the housing head 233 is removably mounted a basket-type upwardly opening strainer 234. The strainer is circular and includes a flat bottom wall 236 upon which the debris collects and an imperforate upwardly extending side wall 237. The bottom wall 236 is provided with sieve openings 242. The strainer slides loosely within the upper housing 233. The entire strainer can be examined visually through the cover and manually removed from the upper housing 233 for cleaning after the cover has been removed.

The housing base 235 contains a water outlet chamber described below. The base 235 is suitably hermetically sealed to the wall of the housing 212 for example by the provision of a circular ring-shaped groove or slot of just the right size to receive the lower circular edge of the wall of housing 212 which is glued therein to provide a secure glue joint 235a.

Slidably mounted within the housing head 233 below the strainer is a flat circular funnel 243, the periphery of which rests upon a supporting shoulder 245 defined by a reduction in the internal bore of the housing head 233. The funnel includes a circular centrally located funnel opening 247 for guiding water toward the pump to be described below. If desired, a diffuser composed of a plurality of fixed diffuser blades (not shown) is incorporated into the lower surface of the funnel. Below the funnel 243 is the filter chamber 213 within which is a suitable removable filter element 248 having fine pores that serve to remove small suspended particulate material. The filter 248 includes a cylindrical outer wall 248a through which incoming water enters from chamber 213, a flat upper wall 248b, a lower wall 248c that rests on the removable ledge 214, and a cylindrical filter core 248d that in this case is a perforated plastic tube. Replaceable filters of this general kind are available commercially. The filter per se forms no part of the invention.

Supported from the base 235 within the filter is a pump drive motor 249. The internal parts of the motor have been omitted from the drawing for clarity of illustration. The side wall of the motor 249 comprises a stainless steel tube 250 defining a motor housing that is closed at its upper end by an upper motor bell housing 249a sealed therein by means of O ring 249b and containing a ball bearing 249c for motor shaft 253. Press fitted into the lower end of the tubular housing 250 is a lower bell housing 249d containing a ball bearing 249e for the lower end of the motor shaft. Extending downwardly through a suitable bore in the housing 249d are electric conductors 251 to power the motor.

Around the upper end of shaft 253 is a mechanical seal assembly 255 for hermetically sealing the motor 249. Secured to shaft 253 above this seal is a water impeller 257 that serves as a pump means. The impeller 257 has a central circular inlet 254 through which water is drawn from the port 247 in funnel 243. The impeller includes radial blades that during operation force the water radially outward across the top of the filter through a pump chamber 258 defined by the space in housing 212 between the top of the filter 248 and the funnel 243. In this way, the conventional pump housing as it is commonly known has been eliminated. From the impeller 257, the water is propelled radially and spirally through the pump chamber 258 and then flows downwardly through an annular space 263 between the filter 248 and the wall of housing 212. From space 263 the water passes into the filter 248 exiting through the perforated core 248d and then traveling downwardly along the housing of motor 249. As water travels downwardly past the surface of the motor, waste heat from the motor is transferred from the motor to the water. This produces significant economy in energy consumption and under some ideal conditions the entire heat needed for the tub or spa can be provided by waste heat from the motor alone.

Within the casing base 235 below the removable ledge 214 is an outlet chamber communicating with the inside bore of the filter through the opening in the center of the ledge 214. In the chamber 283 is a coiled electric heating element 260. The bottom portion of the tubular stainless steel side wall of motor 249 extends below the lower bell housing 249d to form a junction box having two diametrically opposing bores 269 that receive the ends of the heater. The heater is installed by springing its ends apart temporarily, then sliding then into the bores 269. Conductors leading to the heater are designated 264.

While the heater has been shown at the bottom, if desired, it can instead be placed at the top of the filter and the pump impeller at the bottom within chamber 283.

Below the bell housing 249d is a flexible diaphragm seal 265 having an upwardly turned peripheral collar that is hermetically sealed between the tubular wall 250 of the motor and the bell housing. The diaphragm is provided with a sealed aperture 265a for the wires 251. The motor 249 is preferably of the type filled with dielectric fluid. The diaphragm 265, besides sealing the motor, allows for expansion of this fluid. The fluid helps to cool the motor and provides a good heat conduction path to the water.

Three sensors are preferably used, a high limit sensor 266 mounted in the outlet chamber 283, a flow detector sensor 290 mounted in the outlet 218 and a thermostat sensor 312 mounted in the inlet.

The sensors are wired and operate as described above in connection with FIG. 7. The heater 260 is wired just as heater 60 in FIG. 7.

The motor is secured to the base 235 securely by means of a mounting assembly including a flange around motor housing fastened to the base by bolts 271.

During operation the strained and filtered water which has already been prewarmed by motor 249 passes into the outlet chamber 283 over sensors 266 and 290 and over the element 260 where heating is completed.

It can thus be seen that substantial economies are provided by locating the pump and pump motor within the filter housing as described above, and specifically within the center of the filter itself. A number of component parts are thus eliminated but, in addition, two more important objectives are realized, namely the utilization of waste heat from the motor and improved pump efficiencies. Calculations and other data showed that a shaded-pole motor will have an efficiency in the neighborhood of 15-20%. Occasionally, relatively small 1/12-1/6 hp shaded-pole motors are used for continuous circulation systems. The continuous circulation systems, of course, operate 24 hours a day and waste approximately 80% of their input throughout the day. New higher efficiency motors still have efficiencies only in the range of 60%. This means that above 40% of the energy input is still wasted in a conventional arrangement. The invention provides a way of utilizing this heat to supplement the heat provided by the electric heating element or other heater. The invention also provides improved pump efficiency as mentioned above. In a conventional centrifugal pump, water is forced radially outward by centrifugal force due to the spinning impeller. Typically water leaving an impeller passes into a chamber known as a volute which contains water being expelled and, more importantly, re-directs the motion of the water from an expanding radial pattern to one in which all of the water is expelled through a common outlet port. In the present invention the pump chamber and volute which was previously used to direct all water to a single outlet port has been eliminated. Since the water is able to move freely without striking obstructions in accordance with the present invention, it is possible to obtain higher pump efficiencies. In the present invention the centrifugal pumping principle is still employed. However, water which is now moving outwardly in a radial direction with some inherent rotating motion is allowed to be expelled through the chamber 258 defined between the funnel and the filter. The water then makes a right angle turn as it flows downwardly around the outside of the filter. Pump efficiency is high since water flow is unrestricted around the impeller.

The motor 249 can be of any suitable type preferably of the submersible type that utilized water cooling. A submersible well pump, for example, is suitable for use in the present invention.

After the invention has been used for a time, the strainer should be inspected through the clear plastic cover. After the plastic cover is removed, the strainer and funnel are removed for cleaning. Next, the filter element can be removed for cleaning or replacement. Upon removal of the shelf supporting the filter from below, inspection and/or removal of the heating element can also be accomplished. Of course, the pump impeller can also be inspected at this time.

It should be noted that the upper bell housing is provided with a horizontally extending circular flange that just touches the inside edge of the filter top 248b. This will prevent any undesired flow of water from the pump impeller downwardly along the sides of the motor 249.

In summary, the embodiment in FIGS. 10 through 12 requires considerably less floor space and is more compact than previous designs. Since there is no field plumbing required other than the typical inlet and outlet connections, installation time is substantially reduced. In addition, assuming an electric motor with a typical efficiency of approximately 50% is used, since all of the waste heat will warm the water for the tub or spa, the resulting overall efficiency is 100%. Moreover, the pump housing is eliminated and pumping efficiency is improved.

Important benefits were found in placing the pump between the strainer and the filter. With the pump downstream from the strainer, the debris in the strainer will not be stirred up by the pump. Moreover, the strainer functions well under suction with a theoretical limit of 1 atmosphere of pressure while it is desirable to apply much higher pressures to a filter. Thus the pump can build up relatively high pressures even when the filter is dirty thereby allowing the unit to run longer between cleaning intervals.

The funnel 243 enables water to pass directly from the strainer to the eye, i.e. the inlet of the impeller, without intermediate piping. The heater can be easily inspected by removing the ledge 214 and is located in the water flow path to supplement the heat provided by the motor 249 as required.

It is apparent that many modifications and variations of this invention as hereinbefore set forth may be made without departing from the spirit and scope thereof. The specific embodiments described above are given by way of example only and the invention is limited only by the terms of the appended claims.

What is claimed is:

1. A water heater and filtering apparatus for a hot tub, spa, pool, or the like comprising
   (a) a housing having a chamber therein,
   (b) a filter element removably mounted in the chamber, the filter element having relatively small water flow openings therethrough,
   (c) means to open said housing to provide access to the inside of the chamber for removing the filter,
   (d) a basket-shaped strainer removably mounted within the housing and having a bottom wall upon which debris collects during operation for later removal and an upwardly extending side wall at the periphery of the bottom wall, the strainer being characterized by having relatively large visible openings therein and being adapted to remove relatively large debris before it can reach the filter element,
   (e) a water inlet duct in the housing communicating through the housing to the inside thereof and including means for passing the incoming water into the space above the strainer between the strainer and a portion of the housing so that the water entering the housing through the inlet flows first through the basket-shaped strainer and then through the filter,
   (f) a water outlet duct in the housing communicating with the opposite side of the filter from the side communicating with the strainer to exhaust water from the housing and,
   (g) a first heating means comprising an electric heating element mounted within the housing and connected in fluid communication with the filter and strainer between the filter and the water outlet duct for heating the water passing therethrough, the filter thereby removing particles from the water before it reaches the heater to thereby prevent damage to the heater from suspended solids,
   (h) pump means within the housing including an electric pump motor comprising a second heating means and pump impeller connected thereto to force water first through the strainer next through the filter, and then over the heater, waste heat from said second heating means supplementing that from the said first heating means to provide an overall thermal efficiency approximateing 100%,
   (i) the apparatus is adapted to be connected in a water circuit with the tub, spa, or pool to heat and filter the water therein and
   (j) temperature sensor means in heat conductive relationship with water in said water circuit and being wired to the heating element to divide heating between the first and second heating means to thereby maintain a selected temperature.

2. The apparatus of claim 1 wherein said means to provide access to the chamber is an opening in the chamber sealed by a cover formed from a clear transparent material, the strainer and filter are removably mounted within the housing in a position in which the strainer is visible through the cover whereby it is possible to view the condition of the strainer through the cover so that when debris collects on the strainer, the cover can be removed and the strainer and filter then removed for cleaning through the opening in the housing sealed by the cover.

3. The apparatus of claim 1 wherein water pressure sensitive switch means is provided in the housing and is operatively connected to an electrical energizing circuit means for the heater whereby reduction of pressure below a predetermined level will actuate the switch means to thereby de-energize said circuit means and said heater whereby said heater is turned off when the water pressure falls below said predetermined level.

4. The apparatus of claim 1 wherein the strainer is mounted in the housing within said chamber on top of said filter, means providing a water flow compartment between the strainer and the top of the filter through which water that has passed through the strainer flows outwardly to the outside of the filter and said water then flows centrally through the filter into an opening therein.

5. A water heater and filtering apparatus for a hot tub, spa, pool, or the like comprising
   (a) a housing having a chamber therein,
   (b) a filter element removably mounted in the chamber, the filter element having relatively small water flow openings therethrough.
   (c) means to open said housings to provide access to the inside of the chamber for removing the filter,
   (d) a basket-shaped strainer removably mounted within the housing and having a bottom wall upon which debris collects during operation for later removal and an upwardly extending side wall at the periphery of the bottom wall, the strainer being characterized by having relatively large visible openings therein and being adapted to remove relatively large debris before it passes through a pump means and said filter element,
   (e) a water inlet duct in the housing communicating through the housing to the inside thereof and including means for passing the incoming water into the space above the strainer between the strainer and a portion of the housing so that the water entering the housing through the inlet flows first through the basket-shaped strainer and then through the filter,
   (f) a water outlet duct in the housing communicating with the opposite side of the filter from the side communicating with the strainer to exhaust water from the housing and,
   (g) heating means connected in fluid communication with the filter and strainer for heating the water passing therethrough, (h) pump means within the housing to force water first through the strainer and then through the filter, said pump means is a pump impeller mounted in a chamber between said strainer and said filter to draw water first through through the strainer by suction and then impel the water through the filter under pressure, (i) the apparatus is adapted to be connected in a water circuit with the tub, spa, or pool to heat and filter the water therein.

6. The apparatus of claim 5 wherein the pump means comprises a rotatable impeller, a funnel is mounted between the strainer and the pump, said funnel has a central opening of an appropriate size to guide water into an inlet in said impeller.

7. The apparatus of claim 5 wherein the pump comprises a rotatable impeller, said compartment between the strainer and the filter is open and substantially unobstructed whereby the water is impelled outwardly by the impeller and will flow to the outer edge of the filter and thereupon travel axially of the filter along its outside surface whereby a high level of efficiency is achieved by preventing restriction of the flow of water ejected by the pump impeller.

8. The apparatus of claim 5 wherein the pump means is driven by an electric pump motor and said pump and motor are both mounted within the housing whereby waste heat from the motor is used to increase the temperature of the water passing therethrough thereby increasing thermal efficiency.

9. The apparatus of claim 5 wherein the filter has an open center, the motor is mounted within said apparatus in the open center of the filter, the pump is connected at one end thereof between the strainer and filler whereby the debris in the strainer will not be disturbed by the pump and the pump drives the water through the filter under positive pressure.

10. The apparatus of claim 9 wherein a removable funnel is mounted in the housing between the pump and the strainer and the funnel includes a central flow opening for guiding water from the strainer into an inlet in the pump, said funnel can be removed manually following removal of the strainer whereupon the filter can also be removed by lifting it upwardly and the pump means can be inspected.

11. The apparatus of claim 5 wherein the heater is an electric heating element mounted in the housing between said outlet and the filter.

12. A water heater and filtering apparatus for a hot tub, spa, pool, or the like comprising (a) a housing having a chamber therein, (b) a filter element removably mounted in the chamber, the filter element having relatively small water flow openings therethrough, (c) means to open said housing to provide access to the inside of the chamber for removing the filter, (d) a basket-shaped strainer removably mounted within the housing and having a bottom wall upon which debris collects during operation for later removal and an upwardly extending side wall at the periphery of the bottom wall, the strainer being characterized by having relatively large visible openings therein and being adapted to remove relatively large debris before it passes through a pump means and said filter element, (e) a water inlet duct in the housing communicating through the housing to the inside thereof and including means for passing the incoming water into the space above the strainer between the strainer and a portion of the housing so that the water entering the housing through the inlet flows first through the basket-shaped strainer and then through the filter, (f) a water outlet duct in the housing communicating with the opposite side of the filter from the side communicating with the strainer to exhaust water from the housing and, (g) heating means connected to fluid communication with the filter and strainer for heating the water passing therethrough, (h) said filter being cylindrical in shape and being supported in said housing in spaced relationship below the basket-shaped strainer to define a second chamber between the basket-shaped strainer and the top of the filter, said housing having a side wall and an anular space being present between the filter and the side wall of the housing, (i) a pump impeller positioned within the second chamber between the basket-shaped strainer and the top of the filter and being mounted therein for rotation upon a vertical axis extending generally between the center of the strainer and the center of the filter, (j) said filter having a hollow center and a pump motor mounted within the hollow center of the filter and being supported within the housing at its lower end, the upper end of the motor being connected to the pump impeller to rotate the pump impeller about said vertical axis, (k) said impeller having a central inlet at its upper end through which water is drawn after passing through the strainer, said impeller also including radial blades that force water radially outward across the top of the filter through said second chamber defined by the space in the housing between the filter and the strainer whereby the water is propelled at high speed from the impeller radially outward in all directions and spirally through said second chamber and thereupon flows downwardly through said anular space between the filter and the wall of the housing whereby the flow of water passing outwardly from the impeller in all directions is unconfined and unrestricted thereby reducing drag and pressure drop as the water is free to travel radially throughout a circular area of 360° thereby improving pump efficiencies and, (l) said water after passing from said anular space through said filter passes into the hollow center portion of the filter and into heat transfer relationship with a wall of said motor whereby as water travels past the surface of the motor, waste heat from the motor is transferred from the motor to the water to supplement the heat furnished by said heating means to provide an overall thermal efficiency approximating 100% and, (m) said apparatus is adapted to be connected in a water circuit with the tub, spa or pool to heat and filter the water therein.

13. The water heater and filtering apparatus of claim 12 wherein a funnel means is provided above the impeller and between said impeller and the strainer, said funnel extending substantially from the edge of the housing to the center thereof below said strainer and said funnel having a central port therein positioned in alignment with the inlet of the impeller to direct the flow of water from the strainer into the inlet port of the impeller and said second chamber is defined by a space in the housing between the top of the filter and said funnel.

* * * * *

UNITED STATES PATENT AND TRADEMARK OFFICE
CERTIFICATE OF CORRECTION

PATENT NO. : 4,349,434
DATED : September 14, 1982
INVENTOR(S) : William R. Jaworski It is certified that error appears in the above-identified patent and that said Letters Patent is hereby corrected as shown below:

On the title page, Item [76] "26075 Birch Bluff Rd., Excelsior, Minn. 55331" should read -- P.O. Box 22511, Minneapolis, MN 55422 --.

Column 2, line 8, change "housing" to --housings--.
Column 4, line 67, change "150"" to --1/8"--.
          line 68, change "sizes" to --sized--.
Column 5, line 11, change "of" to --or--.
Column 10, line 11, change "above" to --about--.
Column 10, line 40, change "utilized" to --utilizes--.
Column 13, line 5, cancel "through" (first occurrence).
Column 13, line 33, change "filler" to --filter--.
Column 14, line 8, change "to" to --in--.

Signed and Sealed this

Twenty-second Day of February 1983

[SEAL]

Attest:

GERALD J. MOSSINGHOFF

Attesting Officer

Commissioner of Patents and Trademarks